(12) United States Patent
Becks et al.

(10) Patent No.: US 9,303,136 B2
(45) Date of Patent: Apr. 5, 2016

(54) COLORED POLYIMIDE FILMS AND METHODS RELATING THERETO

(75) Inventors: Christopher Robert Becks, Grove City, OH (US); Kuppusamy Kanakarajan, Dublin, OH (US)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 123 days.

(21) Appl. No.: 14/118,389

(22) PCT Filed: Jun. 18, 2012

(86) PCT No.: PCT/US2012/042871
§ 371 (c)(1),
(2), (4) Date: Nov. 18, 2013

(87) PCT Pub. No.: WO2012/177533
PCT Pub. Date: Dec. 27, 2012

(65) Prior Publication Data
US 2014/0103265 A1    Apr. 17, 2014

Related U.S. Application Data (60) Provisional application No. 61/500,906, filed on Jun. 24, 2011, provisional application No. 61/500,852, filed on Jun. 24, 2011, provisional application No. 61/500,866, filed on Jun. 24, 2011, provisional application No. 61/500,877, filed on Jun. 24, 2011, provisional application No. 61/500,918, filed on Jun. 24, 2011, provisional application No. 61/500,943, filed on Jun. 24, 2011.

(51) Int. Cl.
B05D 5/06    (2006.01)
C08K 3/04    (2006.01)
C08K 3/22    (2006.01)

(52) U.S. Cl.
CPC .... *C08K 3/04* (2013.01); *C08K 3/22* (2013.01)

(58) Field of Classification Search
CPC ............... C08K 3/04; C08K 3/22; B05D 5/06
USPC ........... 428/220; 528/353; 524/424; 252/511; 427/162
See application file for complete search history.

(56) References Cited

U.S. PATENT DOCUMENTS

| | | | |
|---|---|---|---|
| 5,302,652 A | 4/1994 | Parrish | |
| 5,358,782 A | 10/1994 | Parrish | |
| 5,854,380 A | 12/1998 | Seto et al. | |
| 6,887,967 B2 * | 5/2005 | Ichinose et al. | 528/170 |
| 7,026,036 B2 | 4/2006 | Leech et al. | |
| 2004/0024107 A1 | 2/2004 | Nojiri et al. | |
| 2006/0083939 A1 | 4/2006 | Dunbar et al. | |
| 2007/0025740 A1 | 2/2007 | Katoh et al. | |
| 2007/0231568 A1 * | 10/2007 | Kanakarajan | 428/343 |
| 2007/0231588 A1 * | 10/2007 | Kanakarajan et al. | 428/458 |
| 2007/0232734 A1 * | 10/2007 | Kanakarajan et al. | 524/413 |
| 2008/0118730 A1 | 5/2008 | Yu et al. | |
| 2009/0101280 A1 | 4/2009 | Asazuma et al. | |
| 2009/0229809 A1 | 9/2009 | Auman et al. | |
| 2009/0236566 A1 | 9/2009 | Hishiura et al. | |
| 2009/0263639 A1 | 10/2009 | Dunbar et al. | |
| 2010/0078596 A1 | 4/2010 | Sonobe | |
| 2011/0039085 A1 * | 2/2011 | Carney et al. | 428/220 |
| 2011/0177321 A1 * | 7/2011 | Carney et al. | 428/323 |
| 2012/0085570 A1 | 4/2012 | Kim et al. | |
| 2012/0126047 A1 | 5/2012 | Skowronski et al. | |
| 2014/0093714 A1 * | 4/2014 | Becks et al. | 428/220 |
| 2015/0166832 A1 * | 6/2015 | Carney et al. | 428/215 |
| 2015/0166833 A1 * | 6/2015 | Carney et al. | 428/215 |

FOREIGN PATENT DOCUMENTS

| | | |
|---|---|---|
| CN | 101579904 B | 6/2009 |
| EP | 0811648 B1 | 9/2001 |
| EP | 1327666 A1 | 9/2001 |
| JP | 63-036550 A | 2/1988 |
| JP | 04-275455 B2 | 1/1992 |
| JP | 2002-127165 A | 5/2002 |
| JP | 2002-296919 A | 10/2002 |
| JP | 2005-068227 A | 3/2005 |
| JP | 2009-025625 A | 2/2009 |
| JP | 2010-169944 A | 8/2010 |
| WO | 99/28787 A2 | 12/1998 |
| WO | 99/28787 A3 | 12/1998 |
| WO | 2010/101822 A1 | 9/2010 |
| WO | 2010/114338 A2 | 10/2010 |
| WO | 2010/114338 A3 | 10/2010 |
| WO | 2010/126047 A1 | 11/2010 |
| WO | 2011/017291 A1 | 2/2011 |

* cited by examiner

*Primary Examiner* — Douglas McGinty (57) ABSTRACT

The present disclosure is directed to a method of increasing optical density by incorporating carbon black in to a colored polyimide composition to obtain a colored polyimide film. The colored polyimide film has 48 to 94 weight percent of a polyimide, 5 to 25 weight percent pigment and 0.05 to 2 weight percent carbon black.

11 Claims, 1 Drawing Sheet

COLORED POLYIMIDE FILMS AND METHODS RELATING THERETO

FIELD OF DISCLOSURE

The present disclosure relates generally to a method of increasing optical density of a colored polyimide film.

BACKGROUND OF THE DISCLOSURE

Broadly speaking, coverlays are known as barrier films for protecting electronic materials, e.g., for protecting flexible printed circuit boards, electronic components, leadframes of integrated circuit packages and the like. A need exists however, for coverlays to be increasingly thin and low in cost, while not only having acceptable electrical properties (e.g., dielectric strength), but also having acceptable mechanical and optical properties to provide security against unwanted visual inspection and tampering of the electronic components protected by the coverlay.

BRIEF DESCRIPTION OF THE DRAWINGS

The disclosure is illustrated by way of example and not limited by the accompanying figures.

SUMMARY

The present disclosure is directed to a method of increasing optical density comprising: incorporating from 0.05 to 2 weight percent carbon black in to a colored polyimide composition to obtain a colored polyimide film comprising:
  i) 48 to 94 weight percent of a polyimide, the polyimide is derived from at least one aromatic diamine and at least one aromatic dianhydride
  ii) 5 to 25 weight percent pigment;
  iii) 0.05 to 2 weight percent carbon black; and
wherein the optical density of the colored polyimide film is increased by at least 15 percent compared to a colored polyimide film incorporating a non-carbon black opacifying agent at the same weight percent.

The present disclosure is also directed to a method of increasing optical density of a colored polyimide film, the method comprising:
  incorporating a carbon black in to a colored polyimide composition in an amount sufficient to achieve at least a 15 percent increase in optical density compared to a colored polyimide composition with a non-carbon black opacifying agent present in the same amount.

DETAILED DESCRIPTION

Definitions

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only to those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

"Dianhydride" as used herein is intended to include precursors or derivatives thereof, which may not technically be a dianhydride but would nevertheless react with a diamine to form a polyamic acid which could in turn be converted into a polyimide.

"Diamine" as used herein is intended to include precursors or derivatives thereof, which may not technically be a diamine but would nevertheless react with a dianhydride to form a polyamic acid which could in turn be converted into a polyimide.

"Polyamic acid" as used herein is intended to include any polyimide precursor material derived from a combination of dianhydride and diamine monomers or functional equivalents thereof and capable of conversion to a polyimide via a chemical or thermal conversion process.

"Prepolymer" as used herein is intended to mean a relatively low molecular weight polyamic acid solution which is prepared by using a stoichiometric excess of diamine in order to give a solution viscosity of approximately 50-100 Poise.

"Chemical conversion" or "chemically converted" as used herein denotes the use of a catalyst (accelerator) or dehydrating agent (or both) to convert the polyamic acid to polyimide and is intended to include a partially chemically converted polyimide which is then dried at elevated temperatures to a solids level greater than 98%.

"Conversion chemical(s)" as used herein denotes a catalyst (accelerator) or a dehydrating agent (or both) used to convert the polyamic acid to polyimide.

"Colored polyimide composition" as used herein is intended to include any polyimide precursor material capable of conversion to a polyimide and containing a pigment, and may or may not be in solution (solvent) and may or may not contain filler.

"Imidized" as used herein is intended to mean when a polyamic acid undergoes ring closure (imidization) to form a polyimide.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used, suitable methods and materials are described herein.

Overview

The present disclosure is directed to a method of increasing optical density of a colored polyimide film. A low amount of carbon black is used to increase optical density compared to a colored polyimide film containing the same amount or more of a non-carbon black opacifying agent.

Polyimide

The polyimide of the present disclosure is derived from at least one aromatic diamine and at least one aromatic dianhydride. In some embodiment, the aromatic dianhydride is selected from the group consisting of: 3,3',4,4'-benzophenone tetracarboxylic dianhydride, 4,4'-oxydiphthalic anhydride, 3,3',4,4'-diphenyl sulfone tetracarboxylic dianhydride, 2,2-bis(3,4-dicarboxyphenyl)hexafluoropropane, bisphenol A dianhydride, mixtures and derivatives thereof. In another embodiment, the aromatic dianhydride is selected from the group consisting of: 2,3,6,7-naphthalene tetracarboxylic dianhydride, 1,2,5,6-naphthalene tetracarboxylic dianhydride, 2,2',3,3'-biphenyl tetracarboxylic dianhydride, 2,2-bis(3,4-dicarboxyphenyl)propane dianhydride, bis(3,4-dicarboxyphenyl)sulfone dianhydride, 3,4,9,10-perylene tetracarboxylic dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, oxydiphthalic dianhydride, bis(3,4-dicarboxyphenyl)sulfone dianhydride, mixtures and derivatives thereof. In another embodiment, the aromatic dianhydride is selected from pyromellitic dianhydride, 3,3',4,4'-biphenyltetracarboxylic dianhydride or mixtures thereof.

In some embodiment, the aromatic diamine is selected from a group consisting of: 3,4'-oxydianiline, 1,3-bis-(4-aminophenoxy)benzene, 1,4-diaminobenzene, 1,3-diaminobenzene, 2,2'-bis(trifluoromethyl)benzidene, 4,4'-diaminobiphenyl, 4,4'-diaminodiphenyl sulfide, 9,9'-bis(4-amino)fluorine, mixtures and derivatives thereof. In another embodiment, the aromatic diamine is selected from a group consisting of: 4,4'-diaminodiphenyl propane, 4,4'-diamino diphenyl methane, benzidine, 3,3'-dichlorobenzidine, 3,3'-diamino diphenyl sulfone, 4,4'-diamino diphenyl sulfone, 1,5-diamino naphthalene, 4,4'-diamino diphenyl diethylsilane, 4,4'-diamino diphenylsilane, 4,4'-diamino diphenyl ethyl phosphine oxide, 4,4'-diamino diphenyl N-methyl amine, 4,4'-diamino diphenyl N-phenyl amine, 1,2-diaminobenzene, mixtures and derivatives thereof. In another embodiment, the aromatic diamine is selected from 4,4'-oxydianiline, praraphenylene diamine or mixtures thereof.

In some embodiments, the polyimide is derived from pyromellitic dianhydride and 4,4'-oxydianiline. In some embodiments, the polyimide is derived from 100 mole percent pyromellitic dianhydride and 100 mole percent 4,4'-oxydianiline. In some embodiments, the polyimide is derived from pyromellitic dianhydride, 3,3',4,4'-biphenyltetracarboxylic dianhydride, 4,4'-oxydianiline and praraphenylene diamine.

In some embodiments, the polyimide is derived from:
15 to 85 mole percent of biphenyltetracarboxylic dianhydride,
15 to 85 mole percent pyromellitic dianhydride,
30 to 100 mole percent paraphenylene diamine and optionally including
0 to 70 mole percent of 4,4'-oxydianiline.

In some embodiments, the polyimide is derived from pyromellitic dianhydride, 4,4'-oxydianiline and paraphenylene diamine. In some embodiments, the polyimide is derived from 3,3',4,4'-biphenyltetracarboxylic dianhydride, 4,4'-oxydianiline and paraphenylene diamine. In some embodiments, the polyimide is derived from pyromellitic dianhydride, 3,3',4,4'-biphenyltetracarboxylic diandydride and 4,4'-oxydianiline. In some embodiments, the polyimide is derived from pyromellitic dianhydride, 3,3',4,4'-biphenyltetracarboxylic dianhydride and paraphenylene diamine. In some embodiments, the polyimide is derived from 3,3',4,4'-biphenyltetracarboxylic dianhydride and paraphenylene diamine. In some embodiments, the polyimide is derived from 3,3',4,4'-biphenyltetracarboxylic dianhydride and 4,4'-oxydianiline. In some embodiments, the polyimide is derived from pyromellitic dianhydride and paraphenylene diamine.

In some embodiments, the polyimide is a low color polyimide. Typically polyimides have some color ranging from yellow to orange/brown. The advantage of a low color polyimide is that when a pigment is added to the polyimide, the resulting colored polyimide film is more true to the color of the pigment. In some embodiments, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide. In some embodiments, the polyimide is derived from at least 50 mole percent of 3,3',4,4'-biphenyltetracarboxylic dianhydride, based on a total dianhydride content of the polyimide and at least 50 mole percent of 2,2'-bis(trifluoromethyl)benzidine based on a total diamine content of the polyimide. In some embodiments, the polyimide is derived from 90 mole percent of 3,3',4,4'-biphenyltetracarboxylic dianhydride, based on a total dianhydride content of the polyimide and 100 mole percent of 2,2'-bis(trifluoromethyl)benzidine. In some embodiments, the polyimide is derived from 100 mole percent of 3,3',4,4'-biphenyltetracarboxylic dianhydride, and 100 mole percent of 2,2'-bis(trifluoromethyl)benzidine. In some embodiments, the polyimide is derived from 45 mole percent of 3,3',4,4'-biphenyltetracarboxylic dianhydride and 55 mole percent of 4,4'-(hexafluoroisoproylidene)diphthalic anhydride based on a total dianhydride content of the polyimide, and at least 50 mole percent of 2,2'-bis(trifluoromethyl)benzidine based on a total diamine content of the polyimide.

In some embodiments, the polyimide is a thermoplastic polyimide. In some embodiments the polyimide is derived from oxydiphthalic dianhydride, pyromellitic dianhydride and 1,3-bis-(4-aminophenoxy)benzene. In some embodiments, the polyimide is derived from oxydiphthalic dianhydride, pyromellitic dianhydride, 1,3-bis-(4-aminophenoxy)benzene and hexamethylene diamine. In some embodiments, the polyimide is derived from biphenyltetracarboxylic dianhydride, 3,3',4,4'-benzophenone tetracarboxylic dianhydride, 1,3-bis-(4-aminophenoxy)benzene and hexamethylene diamine.

In one embodiment, the polyimide is present in an amount between and optionally including any two of the following numbers: 48, 50, 55, 60, 65, 70, 75, 80, 84, 90 and 94 weight percent based on the total weight of the colored polyimide film. In some embodiments, the polyimide is present in an amount from 48 to 94 weight percent based on the total weight of the colored polyimide film. In another embodiment, the polyimide is present amount between and optionally including any two of the following numbers: 73, 75, 80, 85, 90 and 94 weight percent based on the total weight of the colored polyimide film. In another embodiment, the polyimide is present in an amount from 73 to 94 weight percent based on the total weight of the colored polyimide film. In another embodiment, the polyimide is present in an amount from 48 to 84 weight percent based on the total weight of the colored polyimide film.

Pigment

While virtually any pigment (or combination of pigments) can be used in the present disclosure. It is to be understood that carbon black, for the purpose of the present disclosure, is not used as a pigment to color to the polyimide film but rather to increase the optical density.

WO2011017291 to Carney, et al. discloses the amount of low conductivity carbon black and the thickness of the base film will generally impact the optical density. If the low conductivity carbon black loading level is unduly high, the base film will be conductive even when a low conductivity carbon black is used. If too low, the base film may not achieve the desired optical density and color. The low conductivity carbon black, in WO2011017291, is used to impart the black color to the base film as well as to achieve the desired optical density of a base film having a thickness from 8 to 152 microns. The low conductivity carbon black is used as the pigment in amounts to achieve the desired black color and desired optical density. It does not recognize that low amounts of carbon black increase the optical density of a film more than if a non-carbon black opacifying agent is used in the same amount. In some embodiments, the non-carbon black opacifying agent is TiO2 or paliogen black (an organic black pigment). In another embodiment, the non-carbon black opacifying agent can be additional pigment.

Some examples of useful pigments include but are not limited to Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish or Burnt Umber.

In some embodiments, the pigment is selected from, diketopyrrolopyrrole pigment, Perylene Red or Ultramarine Blue. In some embodiments, the pigment is selected from Pigment Blue 29, Pigment Red 264, or Pigment Red 178. In some embodiments, the pigment is 1,4-Diketo-3,6-bis(4-biphenylyl)pyrrolo[3,4-c]pyrrole (Cinilex DPP Rubine SR5H available from Cinic Chemicals America LLC). In some embodiments, the pigment is 2,9-Bis[4-(phenylazo)phenyl]anthra[2,1,9-def:6,5,10-d'e'f']diisoquinoline-1,3,8,10(2H,9H)-tetrone (Paliogen Red L-3880 available from BASF). In some embodiments, the pigment is Ultramarine Blue FP-40, available from Nubiola.

In some embodiments, the pigment is present in an amount between and optionally including any two of the following: 5, 10, 15, 20 and 25 weight percent based on the total weight of the colored polyimide film. In some embodiments, the pigment is present in an amount from 5 to 25 weight percent based on the total weight of the colored polyimide film.

In some embodiments, the pigment is milled. A uniform dispersion of isolated, individual pigment particles (aggregates) tends to produce uniform color intensity.

Carbon Black

Carbon black is used in the present disclosure to increase the optical density of a colored polyimide film. Surprisingly, low amounts of carbon black (0.05 to 2 weight percent) provide an increase in optical density that is not achieved when non-carbon black opacifying agents are used in the same amount or even used in greater amounts.

Some non-carbon black opacifying agents commonly used to increase optical density are, but not limited to, titanium dioxide and zinc oxide. In some embodiments, pigments are used as opacifying agents.

Pigments or non-carbon black opacifying agents must be used in higher amounts to achieve the same optical density as low amounts of carbon black (0.05 to 2 weight percent). In some embodiments, if carbon black is not used, three times the amount of pigment is needed to achieve an optical density of at least 1.4 as measured with a Macbeth TD904 optical densitometer. In some embodiments, five times the amount of anon-carbon black opacifying agent is needed. As the amount of a filler (pigment and other particle additives) increases, the more brittle a film tends to become, making the film more difficult to handle during the manufacturing process. Thus, the use of carbon black is also advantageous for mechanical properties and ease of manufacture due to the lower amounts needed to produce a desirable optical density of at least 1.4 as measured with a Macbeth TD904 optical densitometer.

Another advantage of using low amounts of carbon black in accordance with the present disclosure is a lower overall cost colored polyimide film. Low amounts of inexpensive carbon black is used to reach a desired optical density. In some embodiments, the optical density (opacity) desirable (for example, to hide the conductor traces in the flex circuits from view) is greater than or equal to 1.4 as measured with a Macbeth TD904 optical densitometer. An optical density of 1.4 is intended to mean $1 \times 10^{-1.4}$ or 3.98% of light is transmitted through the colored polyimide film. In some embodiments, the optical density (opacity) desirable is greater than or equal to 1.8 as measured with a Macbeth TD904 optical densitometer. In another embodiment, the colored polyimide film optical density is at least 2 as measured with a Macbeth TD904 optical densitometer.

Even though low amounts of carbon black are used, it would be desirable for the carbon black to be a low conductivity carbon black as to not increase the electrical conductivity of the colored polyimide film. Low conductivity carbon black is intended to mean, a channel black, a furnace black or a surface oxidized carbon black. One method for assessing the extent of surface oxidation (of the carbon black) is to measure the carbon black's volatile content. The volatile content can be measured by calculating weight loss when calcined at 950° C. for 7 minutes. In some embodiments, the carbon black has a volatile content greater than or equal to 1%. In some embodiments, the carbon black has a volatile content greater than or equal to 5%. In some embodiments, the carbon black has a volatile content greater than or equal to 10%. In some embodiments, the carbon black has a volatile content greater than or equal to 13%. In some embodiments, the carbon black is selected from the group consisting of: a carbon black having a volatile content greater than or equal to 13%, a furnace black, a channel black and mixtures thereof.

Channel black (channel type black) typically uses a combination of oil and gas as feedstock, and the traditional channels are replaced by water cooled rollers. A series of small flames impinge on the cooled rollers to deposit the carbon black. The product is scraped off the rollers and collected. This "channel type" process is also known as "roller impingement", and produces products that are basically similar to the classic channel blacks. They typically have a volatile content of up to 5% and if post-treated up to 17%.

In some embodiments, furnace black may be surface treated to increase the volatile content. In some embodiments, the carbon black is Special Black 4, from Evonik Degussa. Generally speaking, a highly surface oxidized carbon black (high volatile content) can be readily dispersed into a polyamic acid solution (polyimide precursor), which in turn can be imidized into a polyimide film.

For the purpose of the present disclosure, the carbon black is present in an amount from 0.05 to 2 weight percent based on the total weight of the colored polyimide film. In some embodiments, the carbon black is present in an amount between and optionally including any two of the following: 0.05, 0.1, 0.5, 1 and 2 weight percent based on the total weight of the colored polyimide film. In some embodiments, the carbon black is present in an amount from 0.1 to 2 weight percent based on the total weight of the colored polyimide film. In another embodiment, the carbon black is present in an amount from 0.5 to 2 weight percent based on the total weight of the colored polyimide film. In another embodiment, the carbon black is present in an amount from 0.05 to 1 weight percent based on the total weight of the colored polyimide film. In another embodiment, the carbon black is present in an amount from 0.1 to 1 weight percent based on the total weight of the colored polyimide film. In another embodiment, the carbon black is present in an amount from 0.5 to 1 weight percent based on the total weight of the colored polyimide film. If carbon black is present in greater than 2 weight percent the color of the film significantly changes. For example, when pigment of the colored polyimide film is a red pigment and greater than 2 weight percent carbon black is used, the resulting film visually looks closer to black not red as intended by the addition of red pigment.

Colored Polyimide Film

The colored polyimide film of the present disclosure comprises:

i) 48 to 94 weight percent of a polyimide, the polyimide is derived from at least one aromatic diamine and at least one aromatic dianhydride;
    ii) 5 to 25 weight percent of a pigment;
    iii) 0.05 to 2 weight percent of a carbon black;
wherein the colored polyimide film has a thickness is from 8 to 152 microns; and wherein the colored polyimide film has an optical density of at least 1.4 as measured with a Macbeth TD904 optical densitometer.

In some embodiments, the colored polyimide films of the present disclosure are useful as coverlays for protecting electronic materials, e.g., for protecting flexible printed circuit boards, electronic components, leadframes of integrated circuit packages and the like. Coverlays need to be thin and low in cost, while having acceptable electrical properties, mechanical properties and optical density to provide security against unwanted visual inspection and tampering of the electronic components protected by the coverlay.

In some embodiments, the colored polyimide film optical density is at least 1.4 as measured with a Macbeth TD904 optical densitometer. In another embodiment, the colored polyimide film optical density is at least 1.8 as measured with a Macbeth TD904 optical densitometer. In another embodiment, the colored polyimide film optical density is at least 2 as measured with a Macbeth TD904 optical densitometer.

In some embodiments, the optical density of the colored polyimide film is increased by at least 8 percent when 0.1 weight percent carbon black is used compared to a colored polyimide film with the same amount of pigment but no carbon black present. In some embodiments, the optical density of the colored polyimide film is increased by at least 27 percent when 0.1 weight percent carbon black is used compared to a colored polyimide film with the same amount of pigment but no carbon black present. In some embodiments, the optical density of the colored polyimide film is increased by at least 30 percent when 0.5 weight percent carbon black is used compared to a colored polyimide film with the same amount of pigment but no carbon black present. In some embodiments, the optical density of the colored polyimide film is increased by at least 47 percent when 1 weight percent carbon black is used compared to a colored polyimide film with the same amount of pigment but no carbon black present. In some embodiments, the optical density of the colored polyimide film is increased by at least 59 percent when 1 weight percent carbon black is used compared to a colored polyimide film with the same amount of pigment but no carbon black present.

Carbon black is advantageous over other non-carbon black opacifying agents. Other non-carbon black opacifying agents do not produce colored polyimide films with the same optical density as when carbon black is used. A larger amount of an non-carbon black opacifying agent is needed to produce a colored polyimide film with equivalent optical density. In some embodiments, at least twenty times the amount of an non-carbon black opacifying agent (compared to carbon black) is needed to produce a colored polyimide film with an equivalent optical density. In another embodiment, the optical density of the colored polyimide film is increased by at least 10 percent compared to a colored polyimide film incorporating a non-carbon black opacifying agent at the same weight percent. In another embodiment, the optical density of the colored polyimide film is increased by at least 15 percent compared to a colored polyimide film incorporating an non-carbon black opacifying agent at the same weight percent. In another embodiment, the optical density of the colored polyimide film is increased by at least 20 percent compared to a colored polyimide film incorporating an non-carbon black opacifying agent at the same weight percent. In another embodiment, the optical density of the colored polyimide film is increased by at least 30 percent compared to a colored polyimide film incorporating an non-carbon black opacifying agent at the same weight percent. In another embodiment, the optical density of the colored polyimide film is increased by at least 40 percent compared to a colored polyimide film incorporating an non-carbon black opacifying agent at the same weight percent. In another embodiment, the optical density of the colored polyimide film is increased by at least 50 percent compared to a colored polyimide film incorporating an non-carbon black opacifying agent at the same weight percent. In another embodiment, the optical density of the colored polyimide film is increased by at least 52 percent compared to a colored polyimide film incorporating an non-carbon black opacifying agent at the same weight percent.

Carbon black is advantageous over organic black pigments. Organic black pigments (for example, paliogen black), do not produce colored polyimide films with the same optical density as when carbon black is used. A larger amount of organic black pigment is needed to produce a colored polyimide film with equivalent optical density. In some embodiments, at least five times the amount of an organic black pigment (compared to carbon black) is needed to produce a colored polyimide film with an equivalent optical density. In some embodiments, the optical density is increased at least 20 percent using carbon black compared to using the same amount of organic black pigment.

Different pigments have different tinting strengths, with carbon black having a high tinting strength. Thus, the amount of color change imparted by the incorporation of carbon black, in accordance with the embodiments of the present disclosure, will depend on the pigment used and the amount of pigment used. Low amounts of carbon black in accordance with the present disclosure will change the color of the polyimide film. It is desirable to maintain some shade of the color imparted by the pigment. For example, when a blue pigment is used, the addition of low amounts of carbon black will darken the color of the colored polyimide film but the colored polyimide film is still a blue color. Generally there is a practical threshold for the amount of carbon black, above which, the optical density will taper off and the colored polyimide film will visually appear black. Above the threshold, large amounts of pigment would have to be added to retain color of the colored polyimide film. The colored polyimide film would be too brittle and would defeat the advantages of utilizing low amounts of carbon black. In some embodiments, the ratio of the amount of pigment to the amount of carbon black is 250, 200, 150, 100, 50, 30, 15 or 5 to 1. For a ratio less than 5 to 1 the film will visually appear black which is undesirable for the purpose of this disclosure.

The amount of pigment and the amount of carbon black can be tailored to obtain desired optical density and desired color. The advantages of the colored polyimide film of the present disclosure are i. lower overall cost, ii. better mechanical properties (e.g., less brittle) thus easily handled during the manufacturing process and iii. a optical density high enough to hide any circuit traces underneath for a film thickness from 8 to 152 microns.

In some embodiments, the colored polyimide film additionally comprises filler. The selection of filler is dependant on the desired use of the colored polyimide film. For example, boron nitride can be added to increase the thermal conductivity of the colored polyimide film. The more boron nitride added, the greater the thermal conductivity. In some embodiments, the colored polyimide film additionally comprises 10 to 25 weight percent of a thermally conductive filler. In another embodiment, the colored polyimide film additionally comprises 10 to 25 weight percent of a dielectric filler. In another embodiment, the colored polyimide film additionally comprises 10 to 25 weight percent of a electrically conductive filler. In some embodiments, a filler may be added to control the coefficient of thermal expansion (CTE). In some embodiments, the colored polyimide film additionally comprises 10 to 25 weight percent of a filler selected from the group consisting of: thermally conductive fillers, dielectric fillers, electrically conductive fillers and mixtures thereof. In some embodiments, the colored polyimide film additionally comprises 10 to 25 weight percent of a filler selected from the group consisting of: talc, mica, silica, kaolin, titanium dioxide, boron nitride, barium titanate, sepiolite, aluminum nitride and mixtures thereof.

In some embodiments, the colored polyimide film comprises:
i) 48 to 94 weight percent of a polyimide, the polyimide is derived from at least one aromatic diamine and at least one aromatic dianhydride;
ii) 5 to 25 weight percent of a pigment;
iii) 0.05 to 2 weight percent of a carbon black;
wherein the colored polyimide film has a thickness is from 8 to 152 microns; and; wherein the colored polyimide film has an optical density of at least 1.4 as measured with a Macbeth TD904 optical densitometer.

In some embodiments, the colored polyimide film comprises:
i) 48 to 94 weight percent of a polyimide, the polyimide is derived from pyromellitic dianhydride and 4,4'-oxydianiline;
ii) 5 to 25 weight percent of pigment;
iii) 0.05 to 2 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
i) 48 to 94 weight percent of a polyimide, the polyimide is derived from pyromellitic dianhydride and 4,4'-oxydianiline;
ii) 5 to 25 weight percent of pigment;
iii) 0.1 to 1 weight percent carbon black;
wherein the colored polyimide film thickness is from 8 to 152 microns; and wherein the colored polyimide film has an optical density of at least 1.8 as measured by measured with a Macbeth TD904 optical densitometer.

In some embodiments, the colored polyimide film comprises:
i) 48 to 94 weight percent of a polyimide, the polyimide is derived from pyromellitic dianhydride and 4,4'-oxydianiline;
ii) 5 to 25 weight percent of pigment;
iii) 0.1 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
i) 48 to 94 weight percent of a polyimide, the polyimide is derived from pyromellitic dianhydride and 4,4'-oxydianiline;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In another embodiment, the colored polyimide film comprises:
i) 48 to 94 weight percent of a polyimide, the polyimide is derived from pyromellitic dianhydride and 4,4'-oxydianiline;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.8 as measured by measured with a Macbeth TD904 optical densitometer.

In another embodiment, the colored polyimide film comprises:
i) 48 to 84 weight percent of a polyimide, the polyimide is derived from pyromellitic dianhydride and 4,4'-oxydianiline;
ii) 5 to 25 weight percent of pigment;
iii) 0.05 to 2 weight percent carbon black;
iv) 10 to 25 weight percent of a filler selected from the group consisting of thermally conductive fillers, dielectric fillers, electrically conductive fillers and mixtures thereof;
wherein the colored polyimide film thickness is from 8 to 152 microns; and wherein the colored polyimide film has an optical density of at least 1.4 as measured by measured with a Macbeth TD904 optical densitometer.

In yet another embodiment, the colored polyimide film of the present disclosure comprises:
i) 48 to 94 weight percent of a polyimide, the polyimide is derived from pyromellitic dianhydride and 4,4'-oxydianiline;
ii) 5 to 25 weight percent of pigment;
iii) 0.05 to 2 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:

i) 48 to 84 weight percent of a polyimide, the polyimide is derived from pyromellitic dianhydride and 4,4'-oxydianiline;
ii) 5 to 25 weight percent of pigment;
iii) 0.05 to 2 weight percent carbon black;
iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, from pyromellitic dianhydride and 4,4'-oxydianiline;
ii) 5 to 25 weight percent of pigment;
iii) 0.1 to 1 weight percent carbon black;
iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, from pyromellitic dianhydride and 4,4'-oxydianiline;
ii) 5 to 25 weight percent of pigment;
iii) 0.5 to 1 weight percent carbon black;
iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, from pyromellitic dianhydride and 4,4'-oxydianiline;
ii) 5 to 25 weight percent of pigment;
iii) 0.1 to 1 weight percent carbon black;
wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, from pyromellitic dianhydride and 4,4'-oxydianiline;
ii) 5 to 25 weight percent of pigment;
iii) 0.5 to 1 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In some embodiments, the colored polyimide film comprises:
i) 48 to 94 weight percent of a polyimide, the polyimide is derived from pyromellitic dianhydride, 3,3',4,4'-biphenyltetracarboxylic diandydride, 4,4'-oxydianiline and paraphenylene diamine;
ii) 5 to 25 weight percent of pigment;
iii) 0.05 to 2 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
i) 48 to 94 weight percent of a polyimide, the polyimide is derived from pyromellitic dianhydride, 3,3',4,4'-biphenyltetracarboxylic diandydride, 4,4'-oxydianiline and paraphenylene diamine;
ii) 5 to 25 weight percent of pigment;
iii) 0.1 to 1 weight percent carbon black;
wherein the colored polyimide film thickness is from 8 to 152 microns; and wherein the colored polyimide film has an optical density of at least 1.8 as measured by measured with a Macbeth TD904 optical densitometer.

In some embodiments, the colored polyimide film comprises:
i) 48 to 94 weight percent of a polyimide, the polyimide is derived from pyromellitic dianhydride, 3,3',4,4'-biphenyltetracarboxylic diandydride, 4,4'-oxydianiline and paraphenylene diamine;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
i) 48 to 94 weight percent of a polyimide, the polyimide is derived from pyromellitic dianhydride, 3,3',4,4'-biphenyltetracarboxylic diandydride, 4,4'-oxydianiline and paraphenylene diamine;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In another embodiment, the colored polyimide film comprises:
i) 48 to 94 weight percent of a polyimide, the polyimide is derived from pyromellitic dianhydride, 3,3',4,4'-biphenyltetracarboxylic diandydride, 4,4'-oxydianiline and paraphenylene diamine;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.8 as measured by measured with a Macbeth TD904 optical densitometer.

In another embodiment, the colored polyimide film comprises:

i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.05 to 2 weight percent carbon black;
   iv) 10 to 25 weight percent of a filler selected from the group consisting of thermally conductive fillers, dielectric fillers, electrically conductive fillers and mixtures thereof; and wherein the colored polyimide film thickness is from 8 to 152 microns; and wherein the colored polyimide film has an optical density of at least 1.4 as measured by measured with a Macbeth TD904 optical densitometer.

In yet another embodiment, the colored polyimide film of the present disclosure comprises:
   i) 48 to 94 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.05 to 2 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
   i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.05 to 2 weight percent carbon black;
   iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
   i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.1 to 1 weight percent carbon black;
   iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
   i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.5 to 1 weight percent carbon black;
   iv) 10 to 25 weight percent of a filler selected from the group consisting of thermally conductive fillers, dielectric fillers, electrically conductive fillers and mixtures thereof; wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
   i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.1 to 1 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
   i) 48 to 84 weight percent of a polyimide, the polyimide is derived from pyromellitic dianhydride, 3,3',4,4'-biphenyltetracarboxylic dianhydride, 4,4'-oxydianiline and paraphenylene diamine;
   ii) 5 to 25 weight percent of pigment;
   iii) 0.5 to 1 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In some embodiments, the colored polyimide film comprises:
   i) 48 to 94 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis (trifluoromethyl)benzidine based on a total diamine content of the polyimide;
   ii) 5 to 25 weight percent of pigment;
   iii) 0.05 to 2 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
   i) 48 to 94 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.1 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In some embodiments, the colored polyimide film comprises:
i) 48 to 94 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.4 as measured by measured with a Macbeth TD904 optical densitometer.

In another embodiment, the colored polyimide film comprises:
i) 48 to 94 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.5 to 1 weight percent carbon black;
wherein the colored polyimide film thickness is from 8 to 152 microns; and wherein the colored polyimide film has an optical density of at least 1.8 as measured by measured with a Macbeth TD904 optical densitometer.

In another embodiment, the colored polyimide film comprises:
i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.05 to 2 weight percent carbon black;
iv) 10 to 25 weight percent of a filler selected from the group consisting of thermally conductive fillers, dielectric fillers, electrically conductive fillers and mixtures thereof; and
wherein the colored polyimide film thickness is from 8 to 152 microns; and wherein the colored polyimide film has an optical density of at least 1.4 as measured by measured with a Macbeth TD904 optical densitometer.

In yet another embodiment, the colored polyimide film of the present disclosure comprises:
i) 48 to 94 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.05 to 2 weight percent carbon black;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.05 to 2 weight percent carbon black;
iv) 10 to 25 weight percent of a filler selected from the group consisting of thermally conductive fillers, dielectric fillers, electrically conductive fillers and mixtures thereof;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.1 to 1 weight percent carbon black;
iv) 10 to 25 weight percent of a filler selected from the group consisting of thermally conductive fillers, dielectric fillers, electrically conductive fillers and mixtures thereof;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:
i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;
ii) 5 to 25 weight percent of pigment;
iii) 0.5 to 1 weight percent carbon black;
iv) 10 to 25 weight percent of a filler selected from the group consisting of thermally conductive fillers, dielectric fillers, electrically conductive fillers and mixtures thereof;
wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:

i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;

ii) 5 to 25 weight percent of pigment;

iii) 0.1 to 1 weight percent carbon black;

wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:

i) 48 to 84 weight percent of a polyimide, the polyimide is derived from least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide;

ii) 5 to 25 weight percent of pigment;

iii) 0.5 to 1 weight percent carbon black;

wherein the colored polyimide film thickness is from 8 to 152 microns; wherein the colored polyimide film has an optical density of at least 1.4 as measured by measured with a Macbeth TD904 optical densitometer; and wherein the carbon black is selected from the group consisting of: a carbon black having a volatile content greater than or equal to 13%, a furnace black, a channel black and mixtures thereof.

In yet another embodiment, the colored polyimide film of the present disclosure comprises:

i) 48 to 94 weight percent of a polyimide, the polyimide is derived from at least one aromatic diamine and at least one aromatic dianhydride;

ii) 5 to 25 weight percent of pigment;

iii) 0.1 to 1 weight percent carbon black; wherein the carbon black is a carbon black having a volatile content greater than or equal to 13%, a furnace black, a channel black or mixtures thereof; wherein the colored polyimide film thickness is from 8 to 152 microns; and wherein the colored polyimide film has an optical density of at least 1.4 as measured by measured with a Macbeth TD904 optical densitometer.

The colored polyimide film, in accordance with any of the above embodiments, wherein the pigment is selected from diketopyrrolopyrrole pigment, Perylene Red or Ultramarine Blue.

In some embodiments, the colored polyimide film in accordance with any of the above embodiments containing filler, wherein the filler selected from the group consisting of: talc, mica, silica, kaolin, titanium dioxide, boron nitride, barium titanate, sepiolite, aluminum nitride and mixtures thereof. In some embodiments, the colored polyimide film in accordance with any of the above embodiments containing filler, wherein the filler is boron nitride. In some embodiments, the colored polyimide film in accordance with any of the above embodiments containing filler, wherein the filler is barium titanate. In some embodiments, the colored polyimide film in accordance with any of the above embodiments containing filler, wherein the filler is sepiolite. In some embodiments, the colored polyimide film in accordance with any of the above embodiments containing filler, wherein the filler is aluminum nitride. In some embodiments, the filler is a mixture of any of the above mentioned fillers.

Preparation of the Colored Polyimide Film

The colored polyimide film can be prepared by any method well known in the art for making a filled polyimide layer. In some embodiments, the colored polyimide film can be prepared by thermal conversion. In some embodiments, the colored polyimide film can be prepared by chemical conversion. The carbon black can be incorporated by any method known in the art for making filled polyimide films, such as but not limited to, preparing a slurry of carbon black and mixing the carbon black slurry with a pigment slurry and a polyamic acid solution in a high shear mixer or directly adding carbon black to a high shear mixer containing a pigment and polyamic acid solution. In one embodiment, a carbon black slurry and a pigment slurry are prepared. The slurries may or may not be milled using a ball mill to reach a desired particle size. The slurries may or may not be filtered to remove any residual large particles. The pigment (or pigment slurry) can be added to the polyamic acid before, at the same time or after carbon black (or carbon black slurry). A polyamic acid solution can be made by methods well known in the art. In one such embodiment, the polyamic acid is made by dissolving approximately equimolar amounts of a dianhydride and a diamine in a solvent and agitating the resulting solution under controlled temperature conditions until polymerization of the dianhydride and the diamine is completed. Typically a slight excess of one of the monomers (usually diamine) is used to initially control the molecular weight and viscosity which can then be increased later via small additional amounts of the deficient monomer. The polyamic acid solution may or may not be filtered. The polyamic acid solution is mixed in a high shear mixer with the carbon black slurry and the pigment slurry. When a polyamic acid solution is made with a slight excess of diamine, additional dianhydride solution may or may not be added to increase the viscosity of the mixture to the desired level for film casting. In some embodiments, the carbon black is incorporated in to a colored polyimide composition. The colored polyimide composition comprises polyimide precursor material capable of conversion to a polyimide and a pigment.

In some embodiments, the mixture of carbon black slurry, pigment slurry and polyamic acid solution (casting solution) is cast into a film on a sheet of Mylar® (polyethylene terephthalate) using a stainless steel rod. The Mylar® sheet containing the wet cast film is immersed in a chemical conversion bath consisting of consisting of a catalyst, dehydrating agent or both to form a gel film. The resulting gel film is peeled from the Mylar® sheet and pressed onto a pin frame and allowed to air dry until enough residual solvent has evaporated that the film visually appears dry, approximately 5 minutes. The gel film is cured in an oven set at 120° C. and ramped up to 320° C. over 45 minutes. After the initial curing either the temperature is increased to 400° C. and held at that temperature for approximately 5 more minutes or the film is placed in another oven at 400° C. for 5 minutes The chemical conversion bath consists of an anhydride (dehydrating agent), a tertiary amine (catalyst) or both, with or without a diluting solvent. In either case, a gel film is formed and the percent conversion of amic acid groups to imide groups in the gel film depends on contact time and temperature but is usually about 10 to 75 percent complete. For curing to a solids level greater than 98% (greater than 98% imidized), the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

In another embodiment, the casting solution is mixed with conversion chemicals. In some embodiments, an anhydride (dehydrating agent) or a tertiary amine (catalyst) or both are used. Then the casting solution is cast or extruded onto a heated conversion surface or substrate such as a belt or drum. In some embodiments the mixture is cooled below 0° C. and mixed with conversion chemicals prior to casting onto a heated rotating drum or belt in order to produce a partially imidized gel film. The gel film may be stripped from the drum or belt, placed on a tenter frame, and cured in an oven, using convective and radiant heat to remove solvent and complete the imization to greater than 98% solids level.

The gel film tends to be self-supporting in spite of its high solvent content. Typically, the gel film is subsequently dried to remove the water, residual solvent, and remaining conversion chemicals, and in the process the polyamic acid is essentially completely converted to polyimide (i.e., greater than 98% imidized). The drying can be conducted at relatively mild conditions without complete conversion of polyamic acid to polyimide at that time, or the drying and conversion can be conducted at the same time using higher temperatures, generally 200° C. to 550° C. Less heat and time are required for thin films than for thicker films.

Because the gel has so much liquid that must be removed during the drying and converting steps, the gel generally must be restrained during drying to avoid undesired shrinkage in fact, in some embodiments, may be stretched by as much as 150 percent of its initial dimension. In film manufacture, stretching can be in either the longitudinal direction or the transverse direction or both. If desired, restraint can also be adjusted to permit some limited degree of shrinkage. In continuous production, the base film can be held at the edges, such as in a tenter frame, using tenter clips or pins for restraint.

In one embodiment, the anhydride (dehydrating agent), is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine (catalyst) is used. Alternatives to acetic anhydride as the anhydride (dehydrating agent) I include: i. other aliphatic anhydrides, such as, propionic, butyric, valeric, and mixtures thereof; ii. anhydrides of aromatic monocarboxylic acids; iii. Mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine (catalyst) is pyridine or beta-picoline is typically used in amounts similar to the moles of anhydride (dehydrating agent). Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methyl pyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure. In some embodiments. 50% acetic anhydride and 50% beta-picoline by volume are used.

Another embodiment of the present disclosure is a method of increasing optical density comprising incorporating carbon black in to a colored polyimide composition to obtain a colored polyimide film comprising:

i) 48 to 94 weight percent of a polyimide derived from at least one aromatic diamine and at least one aromatic dianhydride ii) 5 to 25 weight percent pigment;

iii) between and including any two of the following: 0.05, 0.1, 0.5 and 2 weight percent carbon black; and wherein the optical density of the colored polyimide film is increased by at least 15 percent compared to a colored polyimide film incorporating a non-carbon black opacifying agent at the same weight percent.

Another embodiment of the present disclosure is a method of increasing optical density comprising incorporating from 0.05 to 2 weight percent carbon black in to a colored polyimide composition to obtain a colored polyimide film comprising:

i) 48 to 94 weight percent of a polyimide derived from at least one aromatic diamine and at least one aromatic dianhydride ii) 5 to 25 weight percent pigment;

iii) 0.05 to 2 weight percent carbon black; and wherein the optical density of the colored polyimide film is increased by at least 15 percent compared to a colored polyimide film incorporating a non-carbon black opacifying agent at the same weight percent.

Another embodiment of the present disclosure is a method of increasing optical density comprising incorporating, between and including any two of the following 0.05, 0.1, 0.5, 1 and 2 weight percent, carbon black in to a colored polyimide composition to obtain a colored polyimide film comprising:

i) 48 to 94 weight percent of a polyimide derived from at least one aromatic diamine and at least one aromatic dianhydride ii) 5 to 25 weight percent pigment;

iii) 0.05 to 2 weight percent carbon black; and wherein the optical density of the colored polyimide film is increased by at least 10, 15, 20, 30, 40, 50 or 52 compared to a colored polyimide film incorporating a non-carbon black opacifying agent at the same weight percent.

Another embodiment of the present disclosure is a method of increasing optical density comprising incorporating from 0.05 to 2 weight percent carbon black in to a colored polyimide composition to obtain a colored polyimide film comprising:

i) 48 to 94 weight percent of a polyimide derived from at least one aromatic diamine and at least one aromatic dianhydride ii) 5 to 25 weight percent pigment;

iii) 0.1 to 1 weight percent carbon black; and wherein the optical density of the colored polyimide film is increased by at least 15 percent compared to a colored polyimide film incorporating a non-carbon black opacifying agent at the same weight percent.

Another embodiment of the present disclosure is a method of increasing optical density comprising incorporating from 0.05 to 2 weight percent carbon black in to a colored polyimide composition to obtain a colored polyimide film comprising:

i) 48 to 94 weight percent of a polyimide derived from at least one aromatic diamine and at least one aromatic dianhydride ii) 5 to 25 weight percent pigment;

iii) 0.5 to 1 weight percent carbon black; and wherein the optical density of the colored polyimide film is increased by at least 15 percent compared to a colored polyimide film incorporating a non-carbon black opacifying agent at the same weight percent.

Another embodiment of the present disclosure is a method of increasing optical density comprising incorporating carbon black in to a colored polyimide composition to obtain a colored polyimide film comprising:
i) 48 to 94 weight percent of a polyimide derived from at least one aromatic diamine and at least one aromatic dianhydride
ii) 5 to 25 weight percent pigment;
iii) 0.05 to 2 weight percent carbon black; and
wherein the optical density of the colored polyimide film is increased by at least 15 percent compared to a colored polyimide film incorporating a non-carbon black opacifying agent at the same weight percent; and wherein the carbon black is selected from the group consisting of: a carbon black having a volatile content greater than or equal to 13%, a furnace black, a channel black and mixtures thereof.

Another embodiment of the present disclosure is a method of increasing optical density comprising incorporating from 0.05 to 2 weight percent carbon black in to a colored polyimide composition to obtain a colored polyimide film comprising:
i) 48 to 94 weight percent of a polyimide derived from at least one aromatic diamine and at least one aromatic dianhydride
ii) 5 to 25 weight percent pigment;
iii) 0.05 to 2 weight percent carbon black; and
wherein the optical density of the colored polyimide film is increased by at least 15 percent compared to a colored polyimide film incorporating a non-carbon black opacifying agent at the same weight percent; and wherein the carbon black is selected from the group consisting of: a carbon black having a volatile content greater than or equal to 13%, a furnace black, a channel black and mixtures thereof.

Another embodiment of the present disclosure is a method of increasing optical density comprising incorporating from 0.05 to 2 weight percent carbon black in to a colored polyimide composition to obtain a colored polyimide film comprising:
i) 48 to 94 weight percent of a polyimide derived from at least one aromatic diamine and at least one aromatic dianhydride
ii) 5 to 25 weight percent pigment;
iii) 0.05 to 2 weight percent carbon black; and
wherein the optical density of the colored polyimide film is increased by at least 15 percent compared to a colored polyimide film incorporating a non-carbon black opacifying agent at the same weight percent; and wherein the colored polyimide film additionally comprises from 10 to 25 weight percent of a filler selected from the group consisting of: talc, mica, silica, kaolin, titanium dioxide, boron nitride, barium titanate, sepiolite, aluminum nitride or mixtures thereof.

Another embodiment of the present disclosure is a method of increasing optical density comprising incorporating carbon black in to a colored polyimide composition to obtain a colored polyimide film comprising:
i) 48 to 94 weight percent of a polyimide derived from at least one aromatic diamine and at least one aromatic dianhydride
ii) 5 to 25 weight percent pigment;
iii) 0.05 to 2 weight percent carbon black; and
wherein the optical density of the colored polyimide film is increased by at least 15 percent compared to a colored polyimide film incorporating a non-carbon black opacifying agent at the same weight percent; wherein the carbon black is selected from the group consisting of: a carbon black having a volatile content greater than or equal to 13%, a furnace black, a channel black and mixtures thereof; and wherein the colored polyimide film additionally comprises from 10 to 25 weight percent of a filler selected from the group consisting of: talc, mica, silica, kaolin, titanium dioxide, boron nitride, barium titanate, sepiolite, aluminum nitride or mixtures thereof.

Another embodiment of the present disclosure is a method of increasing optical density comprising incorporating from 0.05 to 2 weight percent carbon black in to a colored polyimide composition to obtain a colored polyimide film comprising:
i) 48 to 94 weight percent of a polyimide derived from at least one aromatic diamine and at least one aromatic dianhydride
ii) 5 to 25 weight percent pigment;
iii) 0.05 to 2 weight percent carbon black; and
wherein the optical density of the colored polyimide film is increased by at least 15 percent compared to a colored polyimide film incorporating a non-carbon black opacifying agent at the same weight percent; wherein the carbon black is selected from the group consisting of: a carbon black having a volatile content greater than or equal to 13%, a furnace black, a channel black and mixtures thereof; and wherein the colored polyimide film additionally comprises from 10 to 25 weight percent of a filler selected from the group consisting of: talc, mica, silica, kaolin, titanium dioxide, boron nitride, barium titanate, sepiolite, aluminum nitride or mixtures thereof.

Another embodiment of the present disclosure is a method of increasing optical density, the method comprising:
incorporating a carbon black in to a colored polyimide composition;
imidizing to obtain a colored polyimide film with at least a 15 percent increase in optical density compared to colored polyimide composition with a non-carbon black opacifying agent present in the same amount; and wherein the colored polyimide film comprises:
i) 48 to 94 weight percent of a polyimide derived from at least one aromatic diamine and at least one aromatic dianhydride; and
ii) 5 to 25 weight percent pigment;
iii) 0.05 to 2 weight percent carbon black.

Another embodiment of the present disclosure is a method of increasing optical density, the method comprising:
incorporating a carbon black in to a colored polyimide composition;
imidizing to obtain a colored polyimide film with at least a 15 percent increase in optical density compared to colored polyimide composition with a non-carbon black opacifying agent present in the same amount; and wherein the colored polyimide film comprises:
i) 48 to 94 weight percent of a polyimide derived from at least one aromatic diamine and at least one aromatic dianhydride; and
ii) 5 to 25 weight percent pigment;
iii) between and including any two of the following: 0.05, 0.1, 0.5 and 2 weight percent carbon black.

Another embodiment of the present disclosure is a method of increasing optical density, the method comprising:
incorporating a carbon black in an amount from 0.05 to 2 weight percent in to a colored polyimide composition;
imidizing to obtain a colored polyimide film with at least a 15 percent increase in optical density compared to colored polyimide composition with a non-carbon black opacifying agent present in the same amount; and wherein the colored polyimide film comprises:

i) 48 to 94 weight percent of a polyimide derived from at least one aromatic diamine and at least one aromatic dianhydride; and
ii) 5 to 25 weight percent pigment;
iii) 0.05 to 2 weight percent carbon black.

Another embodiment of the present disclosure is a method of increasing optical density, the method comprising:

incorporating a carbon black in an amount from 0.1 to 1 weight percent in to a colored polyimide composition;

imidizing to obtain a colored polyimide film with at least a 15 percent increase in optical density compared to colored polyimide composition with a non-carbon black opacifying agent present in the same amount; and wherein the colored polyimide film comprises:

i) 48 to 94 weight percent of a polyimide derived from at least one aromatic diamine and at least one aromatic dianhydride; and
ii) 5 to 25 weight percent pigment;
iii) 0.1 to 1 weight percent carbon black.

Another embodiment of the present disclosure is a method of increasing optical density, the method comprising:

incorporating a carbon black in an amount from 0.5 to 1 weight percent in to a colored polyimide composition;

imidizing to obtain a colored polyimide film with at least a 15 percent increase in optical density compared to colored polyimide composition with a non-carbon black opacifying agent present in the same amount; and wherein the colored polyimide film comprises:

i) 48 to 94 weight percent of a polyimide derived from at least one aromatic diamine and at least one aromatic dianhydride; and
ii) 5 to 25 weight percent pigment;
iii) 0.5 to 1 weight percent carbon black.

Another embodiment of the present disclosure is a method of increasing optical density of a colored polyimide film, the method comprising: incorporating in to a colored polyimide composition a carbon black in an amount sufficient to achieve at least a 15 percent increase in optical density compared to a colored polyimide composition with a non-carbon black opacifying agent present in the same amount.

Another embodiment of the present disclosure is the method in accordance with any of the above embodiments wherein the carbon black is selected from the group consisting of: a carbon black having a volatile content greater than or equal to 13%, a furnace black, a channel black and mixtures thereof.

Another embodiment of the present disclosure is the method in accordance with any of the above embodiments wherein the polyimide is derived from pyromellitic dianhydride and 4,4'-oxydianiline.

Another embodiment of the present disclosure is the method in accordance with any of the above embodiments wherein the polyimide is derived from pyromellitic dianhydride, 3,3',4,4'-biphenyltetracarboxylic dianhydride, 4,4'-oxydianiline and paraphenylene diamine.

Another embodiment of the present disclosure is the method in accordance with any of the above embodiments wherein the polyimide is derived from at least 45 mole percent of 3,3',4,4'-biphenyltetracarboxylic dianhydride, based on a total dianhydride content of the polyimide, and at least 50 mole percent of 2,2'-bis(trifluoromethyl)benzidine based on a total diamine content of the polyimide.

Another embodiment of the present disclosure is the method in accordance with any of the above embodiments wherein the polyimide is derived from pyromellitic dianhydride, 4,4'-oxydianiline and paraphenylene diamine.

Another embodiment of the present disclosure is the method in accordance with any of the above embodiments wherein the colored polyimide film, or the colored polyimide composition, additionally comprises from 10 to 25 weight percent of a filler selected from the group consisting of: talc, mica, silica, kaolin, titanium dioxide, boron nitride, barium titanate, sepiolite, aluminum nitride or mixtures thereof.

Another embodiment of the present disclosure is the method in accordance with any of the above embodiments wherein the colored polyimide film, or the colored polyimide composition, additionally comprises between and including any two of the following: 10, 12, 14, 16, 20, 22, 24 and 25 weight percent of a filler selected from the group consisting of: talc, mica, silica, kaolin, titanium dioxide, boron nitride, barium titanate, sepiolite, aluminum nitride or mixtures thereof.

The colored polyimide film, in accordance with any of the above embodiments, wherein the pigment is selected from diketopyrrolopyrrole pigment, Perylene Red or Ultramarine Blue.

In some embodiments, the colored polyimide film in accordance with any of the above embodiments containing filler, wherein the filler selected from the group consisting of: talc, mica, silica, kaolin, titanium dioxide, boron nitride, barium titanate, sepiolite, aluminum nitride and mixtures thereof. In some embodiments, the colored polyimide film in accordance with any of the above embodiments containing filler, wherein the filler is boron nitride. In some embodiments, the colored polyimide film in accordance with any of the above embodiments containing filler, wherein the filler is barium titanate. In some embodiments, the colored polyimide film in accordance with any of the above embodiments containing filler, wherein the filler is sepiolite. In some embodiments, the colored polyimide film in accordance with any of the above embodiments containing filler, wherein the filler is aluminum nitride. In some embodiments, the filler is a mixture of any of the above mentioned fillers.

In some embodiments, the carbon black incorporated is from 0.1 to 1 weight percent and the colored polyimide film comprises from 0.1 to 1 weight percent carbon black.

In some embodiments, the carbon black incorporated is from 0.5 to 1 weight percent and the colored polyimide film comprises from 0.5 to 1 weight percent carbon black.

EXAMPLES

The invention will be further described in the following examples, which is not intended to limit the scope of the invention described in the claims.

Optical density was measured with a Macbeth TD904 optical densitometer. The averages of 3 individual measurements were recorded. All optical density measurements were taken within an area of film measuring approximately 15 microns thick. Film thickness was verified by multiple measurements across the region in question using a Heidenhain point thickness gage measurement instrument with a motorized Certo probe and a steel pin-type contact tip.

Example 1

Example 1 demonstrates when 0.1 wt % carbon black is used as the opacifying agent, the optical density (1.86) was greater compared to the optical density of a colored polyimide film having the same amount of red pigment but using 1 wt % TiO2 (1.78).

A carbon black slurry was prepared, consisting of 80 wt % DMAC, 10 wt % polyamic acid solution (20.6 wt % polyamic acid solids in DMAC), and 10 wt % carbon black powder (Special Black 4, from Evonik Degussa). The ingredients were thoroughly mixed in a rotor stator, high-speed dispersion mill. The carbon black slurry was then processed in a ball mill to disperse any large agglomerates and to achieve the desired particle size. The median particle size of the carbon black slurry was 0.3 microns. Median particle size was measured using a Horiba LA-930 particle size analyzer. Horiba, Instruments, Inc., Irvine Calif. DMAC (dimethylacetamide) was used as the carrier fluid.

A red pigment slurry was prepared, consisting of 75 wt % DMAC, and 25 wt % red pigment (Paliogen Red L 3880 HD, from BASF). The red pigment slurry was mixed using a Thinky ARE-250 planetary centrifugal mixer.

0.29 g of the carbon black slurry, 5.72 g of the red pigment slurry and 144.00 g PMDA/4,4'ODA polyamic acid solution (20.6% polyamic acid solids in DMAC) were mixed in a Thinky ARE-250, and also degassed in the same equipment. The mixture was manually cast using a stainless steel rod onto a Mylar® polyethylene terephthalate sheet attached to a glass plate. The Mylar® polyethylene terephthalate sheet containing the wet cast film was immersed in a bath consisting of a 50/50 mixture of 3-picoline and acetic anhydride. The bath was gently agitated for a period of 3 to 4 minutes in order to effect imidization and gellation of the film. The resulting gel film was peeled from the Mylar® polyethylene terephthalate sheet and pressed onto a pin frame and allowed to air dry until enough residual solvent has evaporated that the film visually appears dry, approximately 5 minutes. The gel film was then cured in a Blue M high temperature electric oven set at 120° C. and ramped up to 320° C. over 45 minutes. After the initial curing, the film was placed in another Blue M oven at 400° C. for 5 minutes. The resulting film contained 5 wt % red pigment, and 0.1 wt % carbon black.

Figure 1:
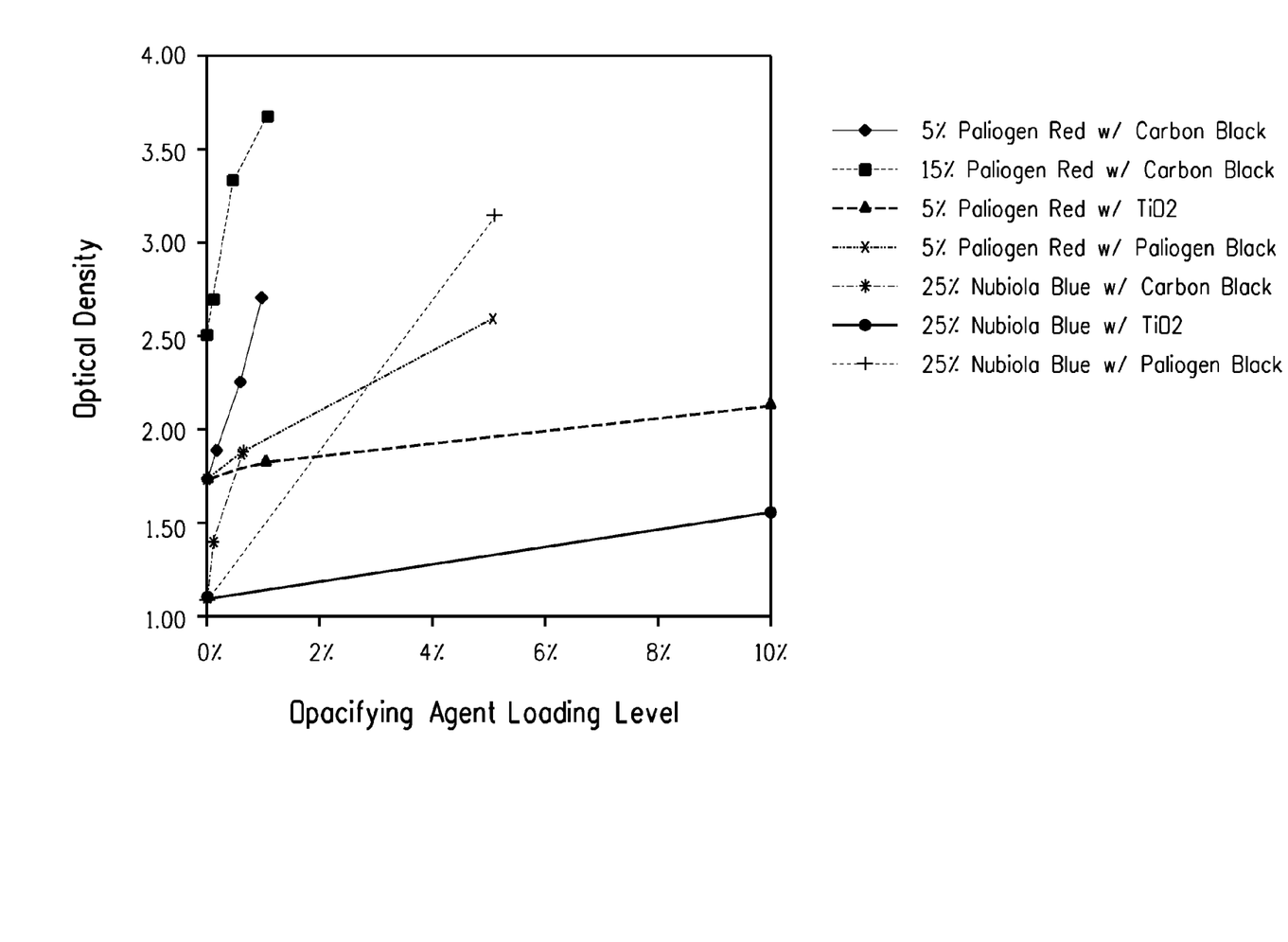
FIG. 1 is a plot of optical density verses opacifying agent loading level.

Optical density verses non-carbon black opacifying agent loading level is plotted in FIG. 1. Results are shown in Table 1.

Example 2

Example 2 demonstrates when using 0.5 wt % carbon black, the optical density (2.21):

is approximately 21% greater compared to the optical density of a colored polyimide film having the same amount of red pigment but using 0.5 wt % paliogen black (1.83), and is greater compared to the optical density of a colored polyimide film having the same amount of red pigment but using 1 wt % TiO2 (1.78), and is greater compared to the optical density of a colored polyimide film having the same amount of red pigment but using 10 wt % TiO2 (2.12).

1.43 g of the carbon black slurry (prepared in Example 1), 5.70 g of the red pigment slurry (prepared in Example 1), and 142.88 g PMDA/4,4'ODA polyamic acid solution (20.6% polyamic acid solids in DMAC) were mixed, cast, and cured in the same process as Example 1. The resulting film contained 5 wt % red pigment, and 0.5 wt % carbon black.

Optical density verses opacifying agent loading level is plotted in FIG. 1. Results are shown in Table 1.

Example 3

Example 3 demonstrates when using 1 wt % carbon black, the optical density (2.70) is approximately 52% greater compared to the optical density of a colored polyimide film having the same amount of red pigment but using 1 wt % TiO2 (1.78), and is approximately 19% greater compared to the optical density of a colored polyimide film having the same amount of red pigment but using 10 wt % TiO2 (2.12).

2.94 g of the carbon black slurry (prepared in Example 1), 5.68 g of the red pigment slurry (prepared in Example 1), and 141.48 g PMDA/4,4'ODA polyamic acid solution (20.6% polyamic acid solids in DMAC) were mixed, cast, and cured in the same process as Example 1. The resulting film contained 5 wt % red pigment, and 1 wt % carbon black.

Optical density verses opacifying agent loading level is plotted in FIG. 1. Results are shown in Table 1.

Comparative Example 1

5.72 g red pigment slurry (prepared in Example 1) and 144.28 g PMDA/4,4'ODA polyamic acid solution (20.6 wt % polyamic acid solids in DMAC) were mixed, cast, and cured in the same process as Example 1. The final cured film contained 5 wt % red pigment.

Results are shown in Table 1.

Example 4

Example 4 demonstrates when using 0.1 wt % carbon black, the optical density (2.70) is increased approximately 8% compared to the optical density of a colored polyimide film having the same amount of red pigment but does not contain an opacifying agent (2.50).

0.29 g of the carbon black slurry (prepared in Example 1), 17.58 g of the red pigment slurry (prepared in Example 1), and 132.12 g PMDA/4,4'ODA polyamic acid solution (20.6% polyamic acid solids in DMAC) were mixed, cast, and cured in the same process as Example 1. The resulting film contained 15 wt % red pigment, and 0.1 wt % carbon black.

Optical density verses opacifying agent loading level is plotted in FIG. 1. Results are shown in Table 1.

Example 5

Example 5 demonstrates when using 0.5 wt % carbon black, the optical density (3.25) is increased approximately 30% compared to the optical density of a colored polyimide film having the same amount of red pigment but does not contain an opacifying agent (2.50).

1.46 g of the carbon black slurry (prepared in Example 1), 17.53 g of the red pigment slurry (prepared in Example 1), and 131.01 g PMDA/4,4'ODA polyamic acid solution (20.6% polyamic acid solids in DMAC) were mixed, cast, and cured in the same process as Example 1. The resulting film contained 15 wt % red pigment, and 0.5 wt % carbon black.

Optical density verses opacifying agent loading level is plotted in FIG. 1. Results are shown in Table 1.

Example 6

Example 6 demonstrates when using 1 wt % carbon black, the optical density (3.67) is increased approximately 47% compared to the optical density of a colored polyimide film having the same amount of red pigment but does not contain an opacifying agent (2.50).

2.91 g of the carbon black slurry (prepared in Example 1), 17.47 g of the red pigment slurry (prepared in Example 1), and 129.62 g PMDA/4,4'ODA polyamic acid solution (20.6% polyamic acid solids in DMAC) were mixed, cast, and cured in the same process as Example 1. The resulting film contained 15 wt % red pigment, and 1 wt % carbon black.

Optical density verses opacifying agent loading level is plotted in FIG. 1. Results are shown in Table 1.

Comparative Example 2

Comparative Example 2 demonstrates that when the amount of red pigment is increase from 5 wt % to 15 wt % the optical density (2.50) is still lower compared to the optical density when the amount of red pigment is 5 wt % and 1 wt % of carbon black is used (2.7).

17.60 g of the red pigment slurry (prepared in Example 1), and 132.40 g PMDA/4,4'ODA polyamic acid solution (20.6% polyamic acid solids in DMAC) were mixed, cast, and cured in the same process as Example 1. The resulting film contained 15 wt % red pigment.

Results are shown in Table 1.

Comparative Example 3

Comparative Example 3 demonstrates that when 1 wt % of titanium dioxide is used as the opacifying agent, the optical density (1.78):

is significantly lower compared to a colored polyimide film having the same amount of red pigment and 1 wt % carbon black (2.70), and is lower compared to a colored polyimide film with 0.5 wt % carbon black (2.21), and is lower compared to a colored polyimide film with 0.1 wt % carbon black (1.86).

Titanium Dioxide slurry was prepared, consisting of 70.15 wt % DMAC, 25 wt % titanium dioxide (Ti-Pure R706, from DuPont), and 4.85 wt % PMDA/4,4'ODA polyamic acid solution (20.6% polyamic acid solids in DMAC). The titanium dioxide slurry was mixed using a Thinky ARE-250 planetary centrifugal mixer.

1.15 g of the titanium dioxide slurry, 5.74 g of the red pigment slurry (prepared in Example 1), and 143.12 g PMDA/4,4'ODA polyamic acid solution (20.6% polyamic acid solids in DMAC) were mixed, cast, and cured in the same process as Example 1. The resulting film contained 5 wt % red pigment, and 1 wt % $TiO_2$.

Optical density verses opacifying agent loading level is plotted in FIG. 1. Results are shown in Table 1.

Comparative Example 4

Comparative Example 4 demonstrates that a colored polyimide film containing 10 wt % titanium dioxide has a lower optical density (2.12) compared to a colored polyimide film having the same amount of red pigment and 1 wt % carbon black (2.70) and has a lower optical density compared to a colored polyimide film having the same amount of red pigment and 0.5 wt % carbon black (2.21).

11.78 g of the titanium dioxide slurry (prepared in Comparative Example 3), 5.89 g of the red pigment slurry (prepared in Example 1), and 132.34 g PMDA/4,4'ODA polyamic acid solution (20.6% polyamic acid solids in DMAC) were mixed, cast, and cured in the same process as Example 1. The resulting film contained 5 wt % red pigment, and 10 wt % $TiO_2$.

Optical density verses opacifying agent loading level is plotted in FIG. 1. Results are shown in Table 1.

Comparative Example 5

Comparative Example 5 demonstrates that when 0.5 wt % of paliogen black (an organic black pigment) is used as the opacifying agent, the optical density (1.83) is significantly lower compared to a colored polyimide film having the same amount of red pigment and 0.5 wt % carbon black (2.21) and has a lower optical density compared to a colored polyimide film having the same amount of red pigment and 0.1 wt % carbon black (1.86).

Black pigment slurry was prepared, consisting of 70.15 wt % DMAC, 25 wt % black pigment (Paliogen Black L 0086, from BASF), and 4.85 wt % PMDA/4,4'ODA polyamic acid solution (20.6% polyamic acid solids in DMAC). The black pigment slurry was mixed using a Thinky ARE-250 planetary centrifugal mixer.

0.57 g of the black pigment slurry, 5.73 g of the red pigment slurry (prepared in Example 1), and 143.70 g PMDA/4,4'ODA polyamic acid solution (20.6% polyamic acid solids in DMAC) were mixed, cast, and cured in the same process as Example 1. The resulting film contained 5 wt % red pigment, and 0.5 wt % black pigment.

Optical density verses opacifying agent loading level is plotted in FIG. 1. Results are shown in Table 1.

Comparative Example 6

Comparative Example 6 demonstrates that when 5 wt % paliogen black is used as the opacifying agent, the optical density (2.59) is still lower than a colored polyimide film having the same amount of red pigment and 1 wt % carbon black (2.70).

5.80 g of the black pigment slurry (prepared in Comparative Example 5), 5.80 g of the red pigment slurry (prepared in Example 1), and 138.40 g PMDA/4,4'ODA polyamic acid solution (20.6% polyamic acid solids in DMAC) were mixed, cast, and cured in the same process as Example 1. The resulting film contained 5 wt % red pigment, and 5 wt % black pigment.

Optical density verses opacifying agent loading level is plotted in FIG. 1. Results are shown in Table 1.

Example 7

Example 7 demonstrates that when 0.1 wt % of carbon black is used the optical density (1.40) is increased 27% compared to colored polyimide films having the same amount of blue pigment but does not contain an opacifying agent (1.10).

Blue pigment slurry was prepared, consisting of 65.15 wt % DMAC, 30 wt % blue pigment (Ultramarine Blue FP-40, from Nubiola), and 4.85 wt % PMDA/4,4'ODA polyamic acid solution (20.6% polyamic acid solids in DMAC). The blue pigment slurry was mixed using a Thinky ARE-250 planetary centrifugal mixer.

26.15 g of the blue pigment slurry, 0.31 g of the carbon black slurry (prepared in Example 1), and 123.54 g PMDA/4,4'ODA polyamic acid solution (20.6% polyamic acid solids in DMAC) were mixed, cast, and cured in the same process as Example 1. The resulting film contained 25 wt % blue pigment, and 0.1% carbon black.

Optical density verses opacifying agent loading level is plotted in FIG. 1. Results are shown in Table 1.

Example 8

Example 8 demonstrates that when 0.5 wt % of carbon black is used the optical density (1.86) is increased 69% compared to a colored polyimide film having the same amount of blue pigment but does not contain an opacifying agent (1.10).

26.07 g of the blue pigment slurry (prepared in Example 7), 1.56 g of the carbon black slurry (prepared in Example 1), and 122.37 g PMDA/4,4'ODA polyamic acid solution (20.6% polyamic acid solids in DMAC) were mixed, cast, and cured in the same process as Example 1. The resulting film contained 25 wt % blue pigment, and 0.5% carbon black.

Optical density verses opacifying agent loading level is plotted in FIG. 1. Results are shown in Table 1.

Comparative Example 7

26.17 g of the blue pigment slurry (prepared in Example 7), and 123.83 g PMDA/4,4'ODA polyamic acid solution (20.6% polyamic acid solids in DMAC) were mixed, cast, and cured in the same process as Example 1. The resulting film contained 25 wt % blue pigment.

Results are shown in Table 1.

Comparative Example 8

Comparative Example 8 demonstrates when 10 wt % TiO2 is used, the optical density (1.56) is lower compared to a colored polyimide film having the same amount of blue pigment but containing 0.5 wt % carbon black (1.86).

12.97 g of the titanium dioxide slurry (prepared in Comparative Example 3), 27.02 g of the blue pigment slurry (prepared in Example 7), and 110.01 g PMDA/4,4'ODA polyamic acid (20.6% polyamic acid solids in DMAC) were mixed, cast, and cured in the same process as Example 1. The resulting film contained 25 wt % blue pigment, and 10 wt % $TiO_2$.

Optical density verses opacifying agent loading level is plotted in FIG. 1. Results are shown in Table 1.

Comparative Example 9

Comparative Example 9 demonstrates that if the amount of paliogen black is extrapolated in FIG. 1 to the same amount of carbon black in examples 7 or 8 (0.1 and 0.5 wt % respectively) the optical density, when using paliogen black, would be much less compared to using carbon black.

6.38 g of the black pigment slurry (prepared in Comparative Example 5), 26.59 g of the blue pigment slurry (prepared in Example 7), and 117.03 g PMDA/4,4'ODA polyamic acid (20.6% polyamic acid solids in DMAC) were mixed, cast, and cured in the same process as Example 1. The resulting film contained 25 wt % blue pigment, and 5 wt % black pigment.

Optical density verses opacifying agent loading level is plotted in FIG. 1. Results are shown in Table 1.

Example 9

Example 9 demonstrates when using 1 wt % carbon black, the optical density (1.99) is approximately 20% greater compared to the optical density of a colored polyimide film having the same amount of blue pigment but using 1 wt % TiO2 (1.65), and is approximately 15% greater compared to the optical density of a colored polyimide film having the same amount of blue pigment but using 1 wt % paliogen black (1.72).

25.97 g of the blue pigment slurry (prepared in Example 7), 3.12 g of the carbon black slurry (prepared in Example 1), and 120.91 g PMDA/4,4'ODA polyamic acid solution (20.6% polyamic acid solids in DMAC) were mixed, cast, and cured in the same process as Example 1. The resulting film contained 25 wt % blue pigment, and 1 wt % carbon black.

Results are shown in Table 1.

Comparative Example 10

Comparative example 10 demonstrates when 1 wt % TiO2 is used, the optical density (1.65) is lower compared to a colored polyimide film having the same amount of blue pigment but containing 1 wt % carbon black (1.99).

1.26 g of the titanium dioxide slurry (prepared in Comparative Example 3), 26.25 g of the blue pigment slurry (prepared in Example 7), and 122.49 g PMDA/4,4'ODA polyamic acid (20.6% polyamic acid solids in DMAC) were mixed, cast, and cured in the same process as Example 1. The resulting film contained 25 wt % blue pigment, and 1 wt % $TiO_2$.

Results are shown in table 1.

Comparative Example 11

Comparative example 10 demonstrates when 1 wt % paliogen black is used, the optical density (1.72) is lower compared to a colored polyimide film having the same amount of blue pigment but containing 1 wt % carbon black (1.99).

1.26 g of the black pigment slurry (prepared in Comparative Example 5), 26.25 g of the blue pigment slurry (prepared in Example 7), and 122.49 g PMDA/4,4'ODA polyamic acid (20.6% polyamic acid solids in DMAC) were mixed, cast, and cured in the same process as Example 1. The resulting film contained 25 wt % blue pigment, and 1 wt % paliogen black.

Results are shown in table 1.

TABLE 1

| Example # | Sample Composition | Optical Density |
|---|---|---|
| 1 | 5% Paliogen Red 0.1% Carbon Black | 1.86 |
| 2 | 5% Paliogen Red 0.5% Carbon Black | 2.21 |
| 3 | 5% Paliogen Red 1% Carbon Black | 2.70 |
| Comp. 1 | 5% Paliogen Red | 1.70 |
| 4 | 15% Paliogen Red 0.1% Carbon Black | 2.70 |
| 5 | 15% Paliagen Red 0.5% Carbon Black | 3.25 |
| 6 | 15% Paliogen Red 1% Carbon Black | 3.67 |
| Comp. 2 | 15% Paliogen Red | 2.50 |
| Comp. 3 | 5% Paliogen Red 1% TiO2 | 1.78 |
| Comp. 4 | 5% Paliogen Red 10% TiO2 | 2.12 |
| Comp. 5 | 5% Paliogen Red 0.5% Paliogen Black | 1.83 |
| Comp. 6 | 5% Paliogen Red 5% Paliogen Black | 2.59 |
| 7 | 25% Nubiola Blue 0.1% Carbon Black | 1.40 |
| 8 | 25% Nubiola Blue 0.5% Carbon Black | 1.86 |
| Comp. 7 | 25% Nubiola Blue | 1.10 |
| Comp. 8 | 25% Nubiola Blue 10% TiO2 | 1.56 |
| Comp. 9 | 25% Nubiola Blue 5% Paliogen Black | 3.16 |
| 9 | 25% Nubiola Blue 1% Carbon Black | 1.99 |
| Comp. 10 | 25% Nubiola Blue 1% TiO2 | 1.65 |
| Comp. 11 | 25% Nubiola Blue 1% Paliogen Black | 1.72 |

Note that not all of the activities described above in the general description or the examples are required, that a portion of a specific activity may not be required, and that further activities may be performed in addition to those described. Still further, the order in which each of the activities are listed are not necessarily the order in which they must be performed. After reading this specification, the ordinary artisan will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification and figures are to be regarded in an illustrative rather than a restrictive sense and all such modifications are intended to be included within the scope of the invention.

What is claimed is:

1. A method of increasing optical density comprising: incorporating carbon black in to a colored polyimide composition to obtain a colored polyimide film comprising:
   i) 48 to 94 weight percent of a polyimide, the polyimide is derived from at least one aromatic diamine and at least one aromatic dianhydride;
   ii) 5 to 25 weight percent pigment;
   iii) 0.05 to 1 weight percent carbon black; and
wherein the colored polyimide film has an optical density of at least 1.4 as measured with a Macbeth TD904 optical densitometer.

2. The method of claim 1, wherein the carbon black incorporated is from 0.1 to 1 weight percent and the colored polyimide film comprises from 0.1 to 1 weight percent carbon black.

3. The method of claim 1, wherein the carbon black incorporated is from 0.5 to 1 weight percent and the colored polyimide film comprises from 0.5 to 1 weight percent carbon black.

4. The method of claim 1, wherein the colored polyimide film additionally comprises 10 to 25 weight percent of a filler selected from the group consisting of: thermally conductive fillers, dielectric fillers, electrically conductive fillers and mixtures thereof.

5. The method of claim 1, wherein the colored polyimide film additionally comprises from 10 to 25 weight percent of a filler selected from the group consisting of: talc, mica, silica, kaolin, titanium dioxide, boron nitride, barium titanate, sepiolite, aluminum nitride or mixtures thereof.

6. The method of claim 1, wherein the pigment is selected from, diketopyrrolopyrrole pigment, Perylene Red or Ultramarine Blue.

7. The method of claim 1, wherein the carbon black is selected from the group consisting of: a carbon black having a volatile content greater than or equal to 13%, a furnace black, a channel black and mixtures thereof.

8. The method of claim 1, wherein the polyimide is derived from pyromellitic dianhydride and 4,4'-oxydianiline.

9. The method of claim 1, wherein the polyimide is derived from pyromellitic dianhydride, 3,3',4,4'-biphenyltetracarboxylic dianhydride, 4,4'-oxydianiline and paraphenylene diamine.

10. The method of claim 1, wherein the polyimide is derived from at least 45 mole percent of 3,3',4,4'-biphenyltetracarboxylic dianhydride, based on a total dianhydride content of the polyimide, and at least 50 mole percent of 2,2'-bis(trifluoromethyl) benzidine based on a total diamine content of the polyimide.

11. The method of claim 1, wherein the polyimide is derived from pyromellitic dianhydride, 4,4'-oxydianiline and paraphenylene diamine.

* * * * *